United States Patent
Ahad et al.

(10) Patent No.: US 10,689,116 B1
(45) Date of Patent: Jun. 23, 2020

(54) SEAT SYSTEM WITH MOUNTING OPTION

(71) Applicant: TIMCO Aviation Services, Inc., Greensboro, NC (US)

(72) Inventors: Sam J. Ahad, Santa Clarita, CA (US); Arakel Melidonian, Chino Hills, CA (US)

(73) Assignee: HAECO Americas, LLC, Greensboro, NC (US)

(*) Notice: Subject to any disclaimer, the term of this patent is extended or adjusted under 35 U.S.C. 154(b) by 633 days.

(21) Appl. No.: 15/350,974

(22) Filed: Nov. 14, 2016

Related U.S. Application Data

(60) Provisional application No. 62/253,859, filed on Nov. 11, 2015.

(51) Int. Cl.
*B64D 11/00* (2006.01)
*B64D 11/06* (2006.01)

(52) U.S. Cl.
CPC .... *B64D 11/00152* (2014.12); *B64D 11/0642* (2014.12)

(58) Field of Classification Search
CPC ....................... B64D 11/0642; B64D 11/00152
See application file for complete search history.

(56) References Cited

U.S. PATENT DOCUMENTS

| | | | |
|---|---|---|---|
| 5,970,884 A | 10/1999 | Taille et al. | 108/44 |
| 7,611,198 B2 | 11/2009 | Schweizer | 297/217.3 |
| 8,267,472 B2 | 9/2012 | Large et al. | 297/217.3 |
| 8,418,319 B2* | 4/2013 | Nagami | B60R 11/0235 16/297 X |
| 8,667,904 B2 | 3/2014 | Pajic | 108/44 |
| 8,950,814 B2* | 2/2015 | Lohmann | B60N 2/3009 297/410 X |
| 9,010,852 B1 | 4/2015 | Conrad et al. | 297/217.3 |
| 9,067,682 B2 | 6/2015 | Pajic | 108/44 |
| 9,360,895 B2* | 6/2016 | Shah | B64D 11/00151 |
| 2013/0242523 A1 | 9/2013 | Wallace et al. | 361/807 |
| 2014/0191005 A1 | 7/2014 | Pajic | B60R 11/02 |
| 2015/0034687 A1* | 2/2015 | Terleski | B64D 11/0015 224/275 X |
| 2016/0023766 A1 | 1/2016 | Pajic | B64D 11/0638 |
| 2016/0039525 A1 | 2/2016 | Pajic | B64D 11/0638 |
| 2016/0114891 A1 | 4/2016 | Pajic | B64D 11/00152 |

* cited by examiner

*Primary Examiner* — Anthony D Barfield
(74) *Attorney, Agent, or Firm* — MacCord Mason PLLC

(57) ABSTRACT

A seat system for a passenger aircraft. The seat system includes at least one passenger seat and a mounting option for electronic devices attached to the passenger seat. The mounting option may include (i) a bracket adapted to be attached to the backrest of the passenger seat; and (ii) a first mount including a tilt assembly attached to the bracket for receiving a first electronic device having a monitor or a knockout blank for a monitor; and (iii) a second mount including a shelf attached to the tilt assembly for receiving a second electronic device having a monitor or a knockout blank for a monitor. The seat system may further include a quick detach mechanism for removing the first electronic device having a monitor from the first mount.

62 Claims, 11 Drawing Sheets

SEAT SYSTEM WITH MOUNTING OPTION

BACKGROUND OF THE INVENTIONS

(1) Field

The present inventions relates generally to seat systems for passenger vehicles and, more particularly, to a seat system for a passenger aircraft.

(2) Related Art

Passenger seats on passenger aircraft, buses, trains and ferries generally are arranged so that each passenger seat, other than the most forward located passenger seats, faces the back of the next forward passenger seat. Many passenger seat backs are utilized to install amenities for the passenger's use during the trip. For example, an upper surface of the seat back may be used to install inflight entertainment, other display devices and/or as an area for additional storage of amenities, such as reading materials or passenger safety cards.

Some passengers prefer to use their own portable electronic devices during air travel; for instance, to view media content stored within the device or to interact with other installed software. Presently, a passenger must either hold the device or place it on a tray table. Holding the device for extended periods of time can lead to muscle fatigue. Placing the device on a tray table could also lead to neck fatigue, particularly if the device is placed at an uncomfortable viewing angle. Moreover, there is a risk of damage to the device or harm to other passengers if the device is not secured to the tray table.

Thus, there remains a need for a new and improved seat system for a passenger aircraft having a mounting option adapted to hold a first electronic device while, at the same time, allowing a passenger to securably mount a second electronic device and adjust the viewing angle as desired.

SUMMARY OF THE INVENTIONS

The present inventions are directed to a seat system for a passenger aircraft. The seat system includes at least one passenger seat and a mounting option for electronic devices attached to the passenger seat. The mounting option may include (i) a bracket adapted to be attached to the backrest of the passenger seat; (ii) a first mount including a tilt assembly attached to the bracket for receiving a first electronic device having a monitor or a knockout blank for a monitor; and (iii) a second mount including a shelf attached to the tilt assembly for receiving a second electronic device having a monitor, whereby the second mount positions the second electronic device overlaying the first electronic device having a monitor or a knockout blank for a monitor and the shelf tilts with the tilt assembly. The seat system may further include a quick detach mechanism for removing the first electronic device having a monitor from the first mount.

The tilt assembly may include an OEM monitor mount and a pair of torque hinges attached between the OEM monitor mount and the bracket attached to the backrest. The pair of torque hinges may be adjustable to accommodate for the weight of the OEM monitor mount. The pair of torque hinges may also be top mounted to provide upward tilting when the backrest of the passenger seat is reclined.

The shelf attached to the tilt assembly for tilting with the tilt assembly may include a slot for receiving the second electronic device having a monitor. The shelf may be constructed of a non-mar material for protecting the outer surface of the second electronic device having a monitor. The shelf may be over molded with a non-mar material. The shelf may also be retractable.

The second mount may include a bracket attached to the tilt assembly. In one embodiment, the bracket is a cantilevered bracket mounted to the tilt assembly. In one embodiment, the cantilevered bracket is biased towards the backrest for holding the second electronic device having a monitor in a position overlaying the first electronic device having a monitor. The cantilevered bracket may be formed of a one-piece generally J-shaped resilient material. The cantilevered bracket may be constructed of a non-mar material for protecting the outer surface of the second electronic device having a monitor. The cantilevered bracket may be over molded with a non-mar material.

The bracket may further include a plate mounted onto the second mount. The plate may be mounted onto the second mount with one or more guides, the second mount adapted for translocation on the guides. The plate may further include one or more slots to limit translocation of the second mount on the guides.

A spring may be further included and adapted to bias the second mount toward the backrest.

The bracket may further include a hinge adapted to be connected to the second mount.

In one embodiment, the bracket is attached to the shelf.

A retainer assembly may be further included for holding the second electronic device having a monitor in a position overlaying the first electronic device having a monitor. The retainer assembly and the shelf may be one piece. The bracket may be attached to the retainer assembly.

The quick detach mechanism may include key slots and a retainer clip.

The first electronic device may include an OEM monitor. The passenger seat may further include a monitor bezel surrounding the OEM monitor. In one embodiment, the monitor bezel is a two-piece construction.

The passenger seat may include a base frame, a seat component attached to the base frame and a backrest attached to the base frame adjoining the seat component. The backrest may further include a headrest. The headrest may be adjustable to accommodate for the height of the passenger.

The passenger seat may further include an upholstery package. The passenger seat may also further includes a trim package.

Accordingly, one aspect of the present inventions is to provide a seat system for a passenger aircraft, the seat system including (a) at least one passenger seat; and (b) a mounting option for electronic devices attached to the passenger seat, the mounting option including a first mount adapted to receive a first electronic device having a monitor or a knockout blank for a monitor and a second mount adapted for receiving a second electronic device having a monitor, wherein the second mount positions the second electronic device overlaying the first electronic device having a monitor or a knockout blank for a monitor.

Another aspect of the present inventions is to provide in a seat system for a passenger aircraft wherein the seat system includes at least one passenger seat having a backrest, the improvement comprising a mounting option for at least two electronic devices one overlaying the other electronic device, the mounting option including (a) a bracket adapted to be attached to the backrest of the passenger seat; (b) a first mount including a tilt assembly attached to the bracket for receiving a first electronic device having a monitor or a knockout blank for a monitor; and (c) a second mount including a shelf attached to the tilt assembly for receiving a second electronic device having a monitor, whereby the second mount positions the second electronic device overlaying the first electronic device having a monitor or a knockout blank for a monitor and the shelf tilts with the tilt assembly.

Still another aspect of the present inventions is to provide a seat system for a passenger aircraft, the seat system including (a) at least one passenger seat; (b) a mounting option for electronic devices attached to the passenger seat, the mounting option including (i) a bracket adapted to be attached to the backrest of the passenger seat; (ii) a first mount including a tilt assembly attached to the bracket for receiving a first electronic device having a monitor or a knockout blank for a monitor; and (iii) a second mount including a shelf attached to the tilt assembly for receiving a second electronic device having a monitor, whereby the second mount positions the second electronic device overlaying the first electronic device having a monitor or a knockout blank for a monitor and the shelf tilts with the tilt assembly; and (c) a quick detach mechanism for removing the first electronic device having a monitor from the first mount.

These and other aspects of the present inventions will become apparent to those skilled in the art after a reading of the following description of embodiments when considered with the drawings.

DESCRIPTION OF THE EMBODIMENTS

Figure 1:
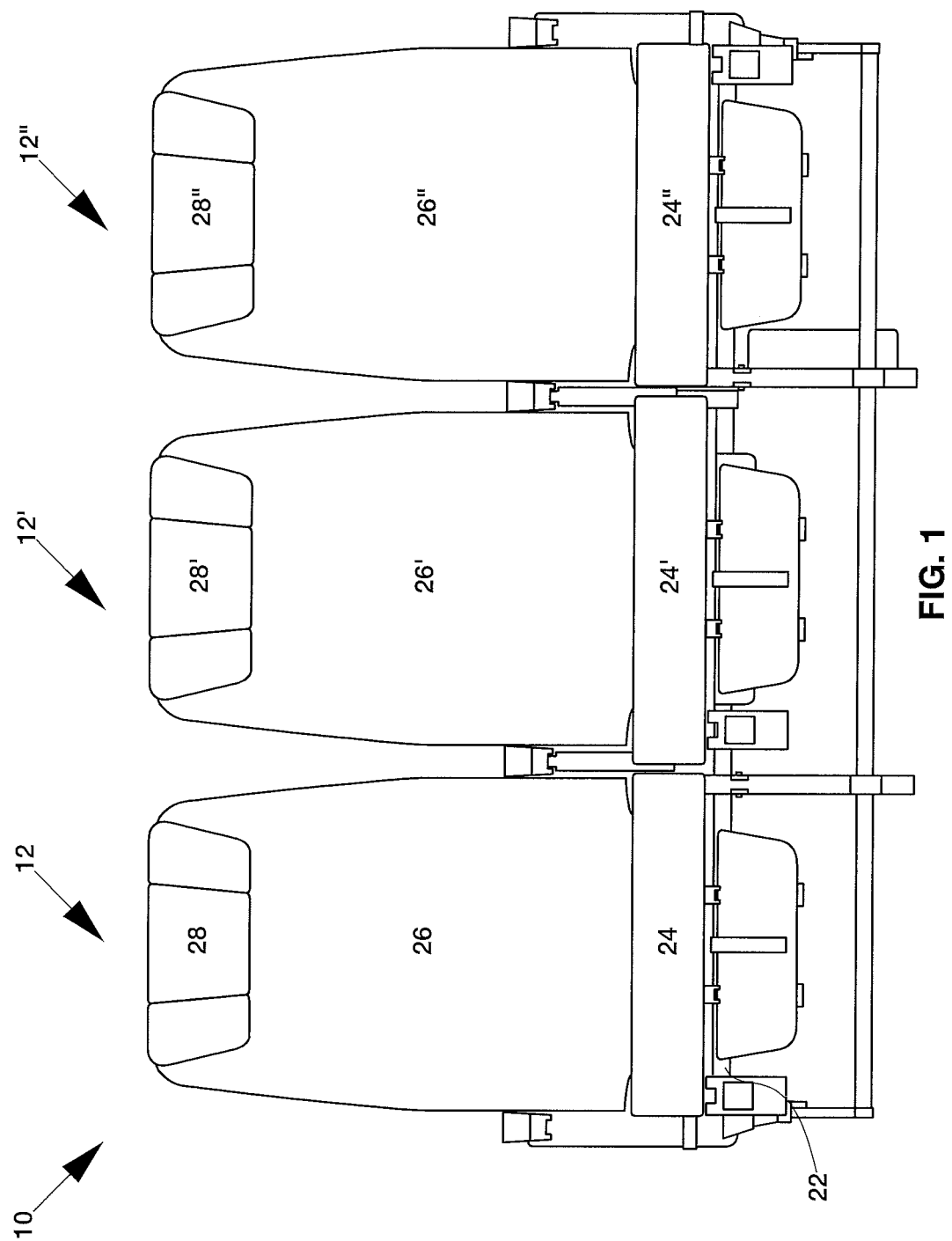
FIG. 1 is a front elevations view of one embodiment of a seat system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12.

Each of the passenger seats 12 may include a base frame 22, a seat component 24 attached to a base frame and a backrest 26 attached to the base frame 22 adjoining the seat component 24. The backrest 26 may further include a headrest 28. In one embodiment, headrest 28 is adjustable to accommodate the height of a passenger.

Figure 2:
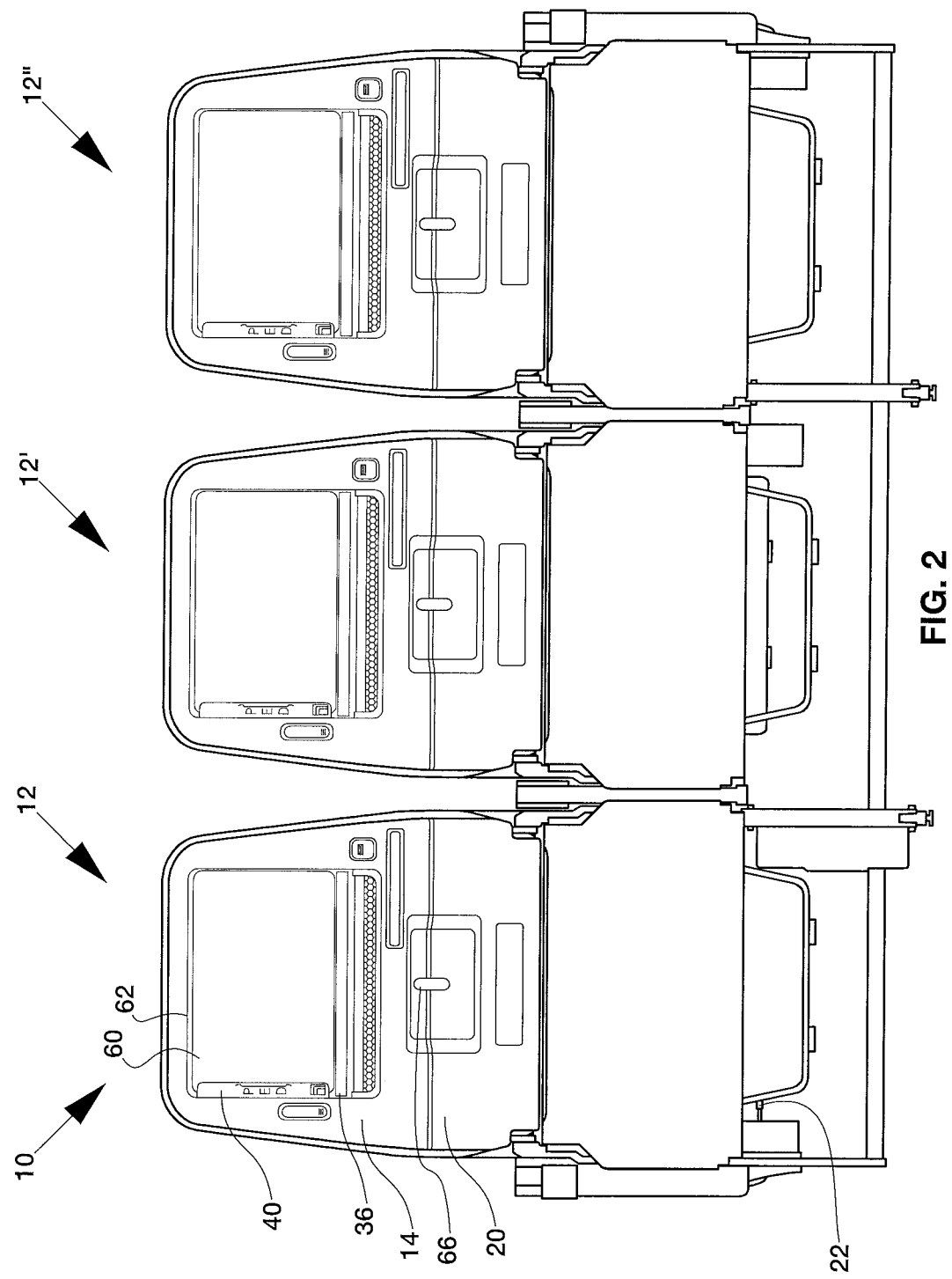
FIG. 2 is a rear elevational view of the embodiment shown in FIG. 1.

Turning to FIG. 2, there is shown a rear view of the seat system 10 constructed according to the present inventions. A seat back bezel 14 is attached to the back of the passenger seat 12. The seat back bezel 14 may adjoin a seat back tray table 20 attached to the back of passenger seat 12. The seat back tray table 20 attached to the back of the passenger seat 12 is movable between its first storage position and a second deployed position. A lock mechanism 66 attached to the back of the seat back bezel 14 is adapted to retain the seat back tray table 20 in its secured position. The passenger seat 12 may further include an upholstery package and may include a trim package.

FIG. 2 depicts one embodiment of a mounting option for electronic devices attached to passenger seat 12. The mounting option includes a first mount adapted for receiving a first electronic device 60 and a second mount adapted for receiving a second electronic device 64 (device shown in FIG. 4). The second mount positions the second electronic device 64 overlaying the first electronic device 60. As shown in FIG. 2, the first electronic device 60 is an OEM monitor. First electronic device 60 may further include a bezel 62, and bezel 62 may be a two-piece construction. The second electronic device 64 may be a phone or a tablet. The second mount includes a shelf 36 for placement of the second electronic device and a retainer assembly 40 for securing the second electronic device in place.

Figure 3:
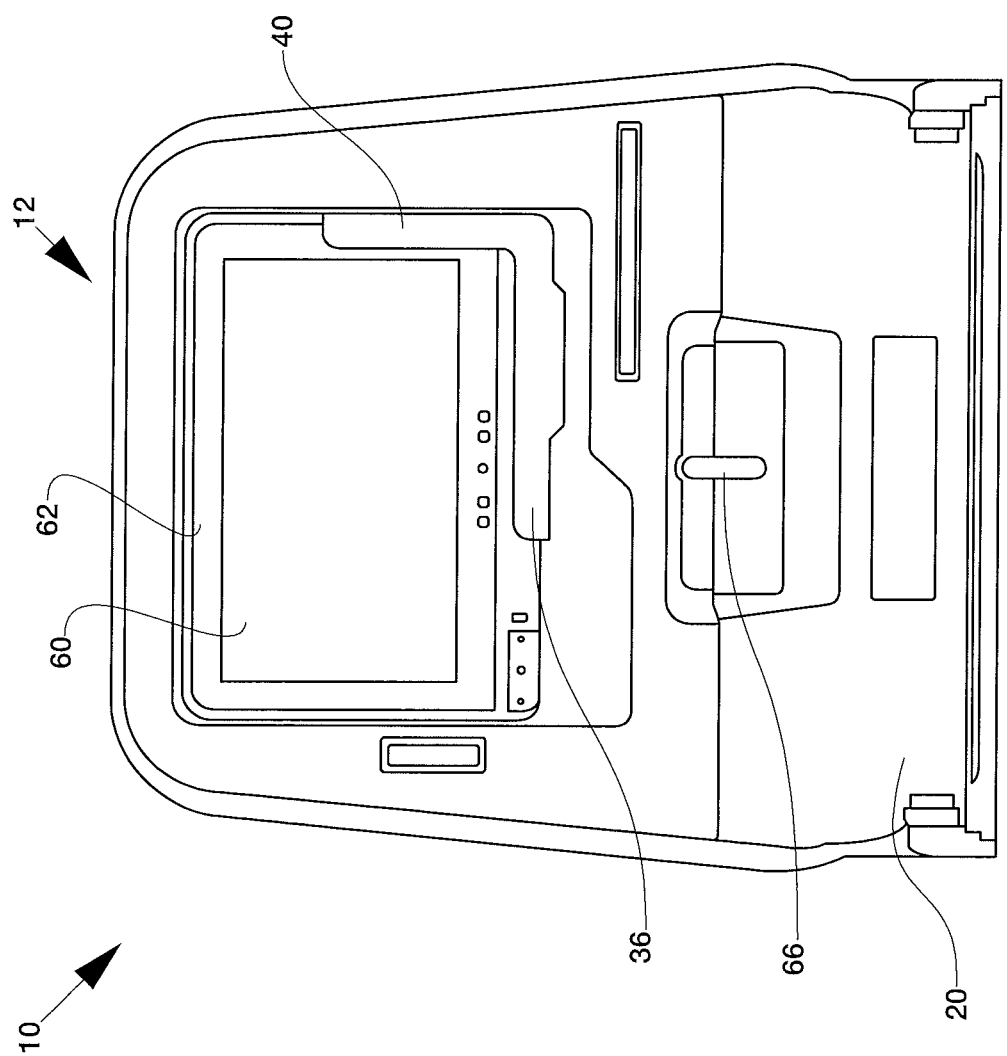
FIG. 3 is an enlarged back elevational view of a seat system with another embodiment of a mounting option constructed according to the present inventions.
Figure 4:
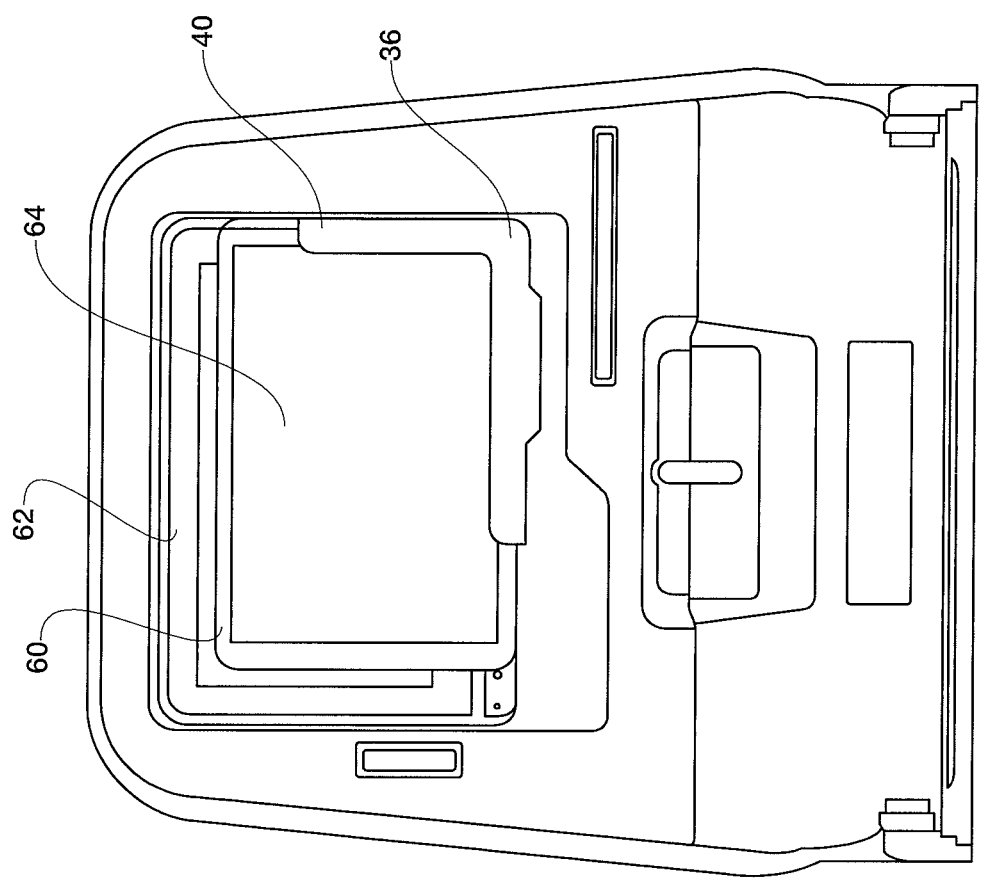
FIG. 4 is an enlarged back elevational view of the seat system in FIG. 3 having a second electronic device within the second mount.

As best seen in FIGS. 3 and 4, shelf 36 and retainer assembly 40 may be one piece. Second electronic device 64 is preferentially placed within shelf 36 and retainer assembly 40 to secure it to headrest 28 of passenger seat 12. In these embodiments, the second mount may be configured to accept and secure a variety of sized electronic devices by pulling on a retractable shelf 36. While shelf 36 is pulled, second electronic device 64 may be partially inserted into a slot 46 (see FIG. 6A). Once the second electronic device 64 is at least partially inserted into slot 46, shelf 36 may be released to secure second electronic device 64 in place.

Figure 5A:
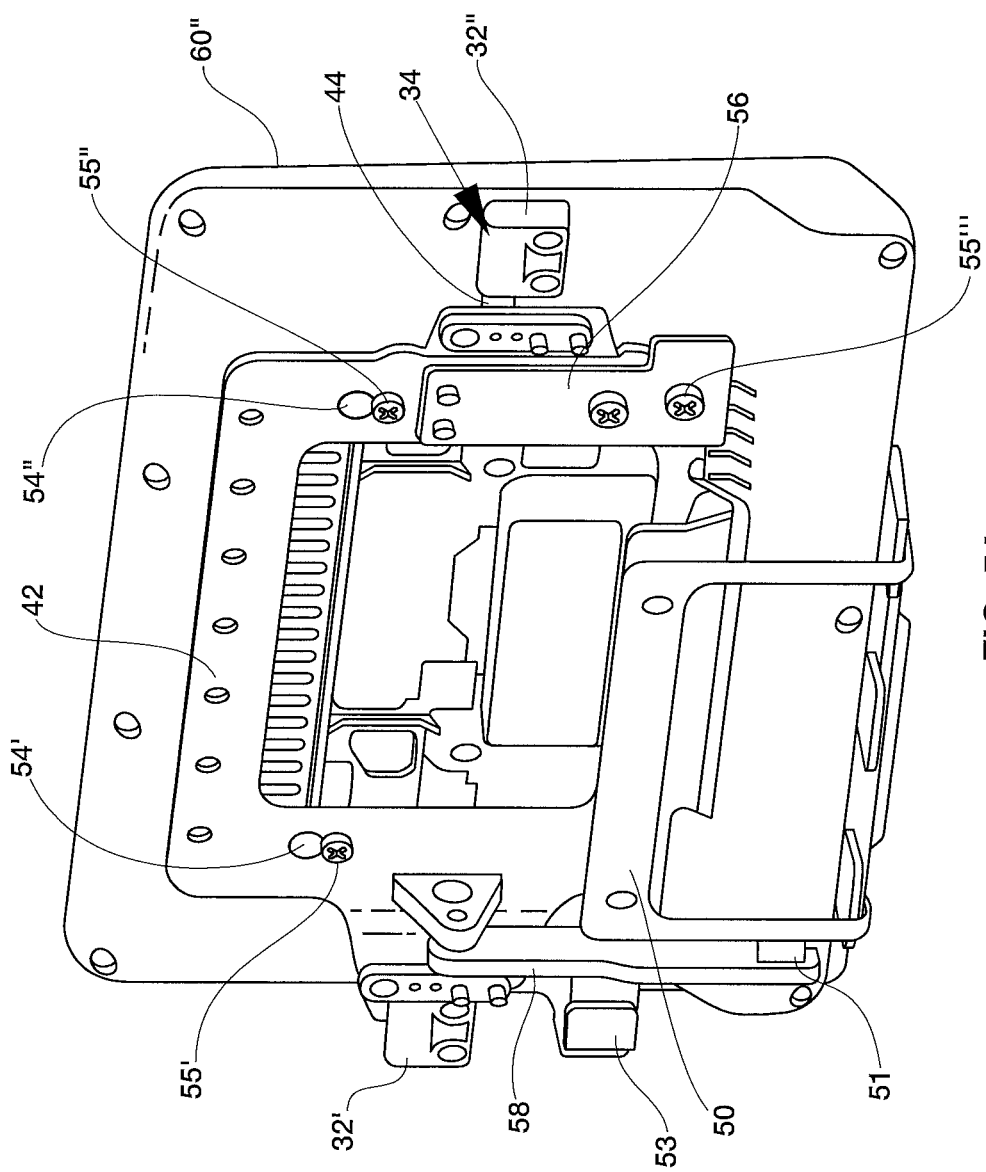
FIG. 5A is an enlarged rear perspective view of the mounting option in FIG. 3.
Figure 5B:
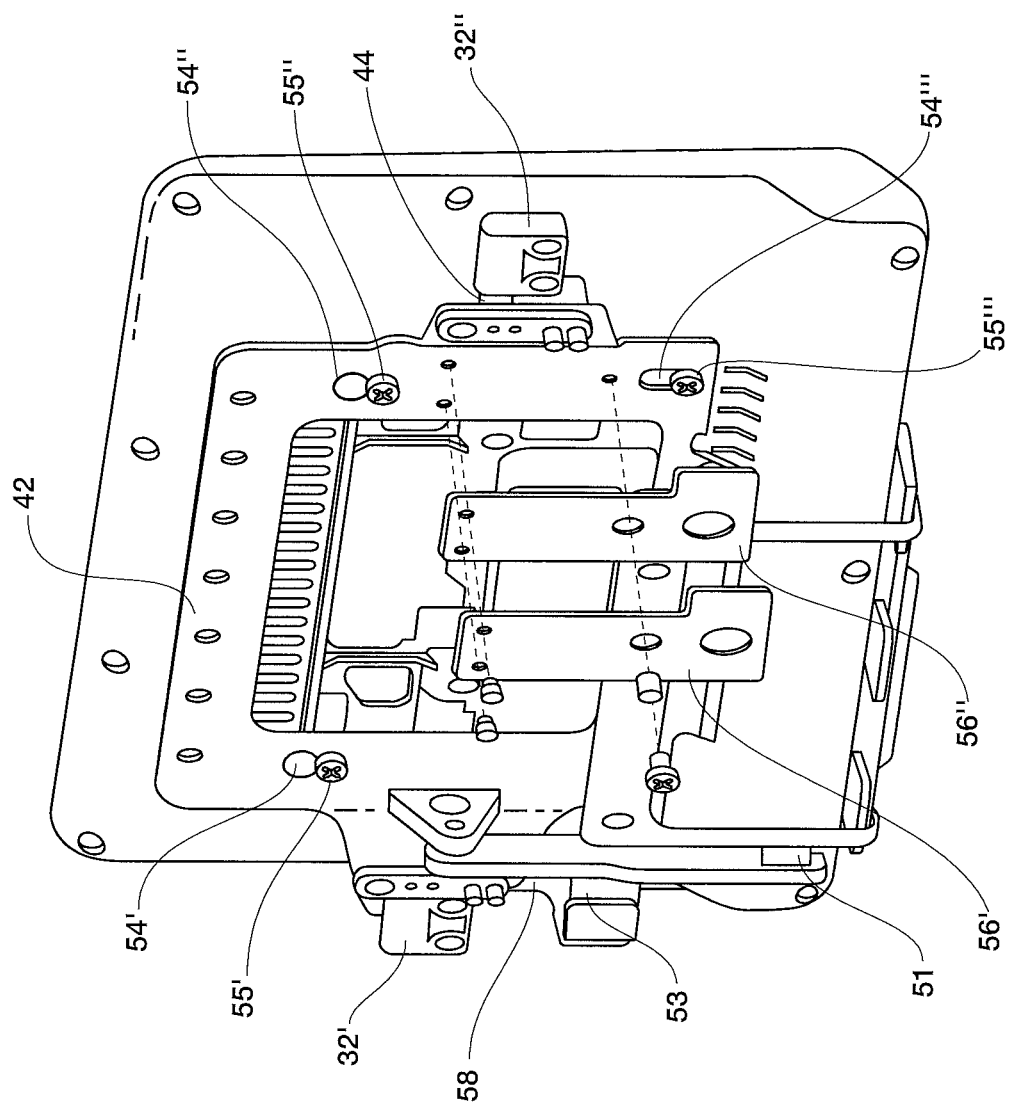
FIG. 5B is an enlarged exploded rear perspective view of the mounting option in FIG. 3.

FIG. 5A shows an assembled view of one embodiment of the mounting system with an OEM monitor 60 installed, and FIG. 5B shows an exploded view of the same embodiment. As shown, the first mount 42 may be an OEM monitor mount for mounting. First mount 42 may further include a quick detach mechanism for mounting and releasing first electronic device 60. In the embodiment shown, the quick detach mechanism includes key slots 54 and a retainer clip 56. Key slots 54 are adapted to receive screws 55 fastened onto first electronic device 60. The number of key slots 54 may vary depending on the embodiment. First electronic device 60 may be quickly removed by positioning it such that screws 55 overlay the larger portions of key slots 54 thereby enabling the heads of each screw to pass through key slots 54. One or more retainer clips 56 may be included to further secure first electronic device 60 onto bracket 42, by preventing at least one screw 55 from being slidably removed out of key slot 54. Retainer clip 56 may be secured onto first mount 42 using any fastening means.

As can be seen in FIGS. 5A and 5B, the first mount may include a tilt assembly 34 to adjust orientation of the mounted electronic devices. For instance, a passenger sitting in passenger seat 12 may recline the backrest, potentially positioning the mounted electronic devices at a less desirable angle for viewing. Tilt assembly 34 enables a user viewing the electronic devices to adjust the viewing angle as desired. In one embodiment, tilt assembly 34 may include a pair of torque hinges 44 attached between first mount 42 and a bracket 32 attached to the backrest. Torque hinges 44 may be adjustable to accommodate for the weight of the OEM monitor mount 42. Torque hinges 44 are preferably top mounted to provide upward tilting when backrest 26 of passenger seat 12 is reclined, but may be positioned anywhere alongside first mount 42 in other embodiments.

Figure 6A:
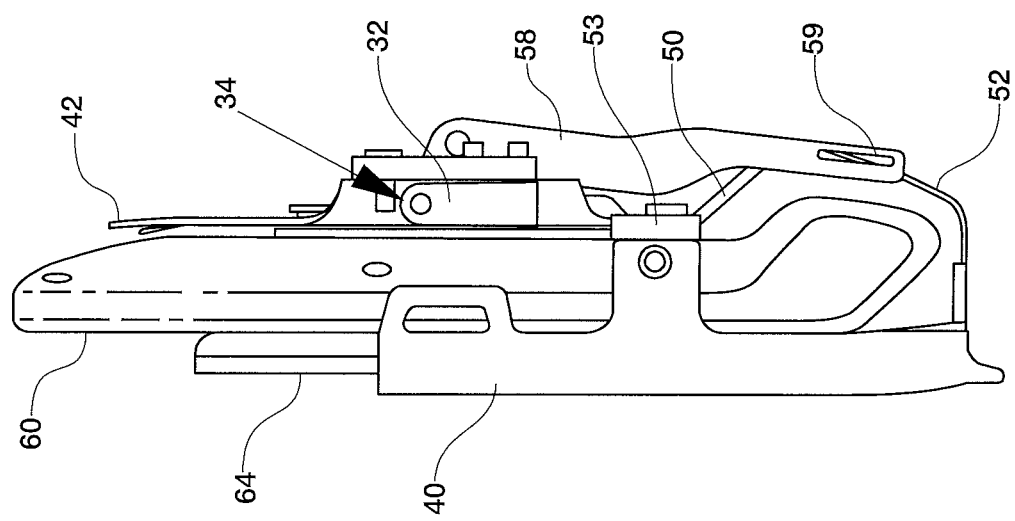
FIG. 6A is an enlarged cross-sectional left side view of the mounting with a second electronic device.
Figure 6B:
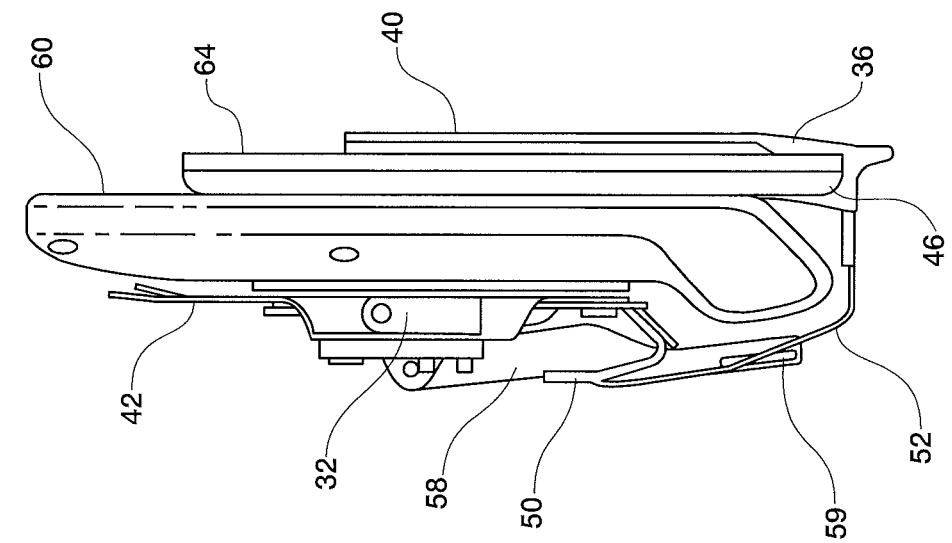
FIG. 6B is an enlarged cross-sectional right side view of the mounting option with a second electronic device.

Turning to FIGS. 6A and 6B, the second mount includes shelf 36 having a slot 46 for receiving the second electronic device. In some embodiments, shelf 36 is constructed of a non-mar material to protect the outer surface of the second electronic device. In yet another embodiment, shelf 36 is over molded with a non-mar material.

Figure 7:
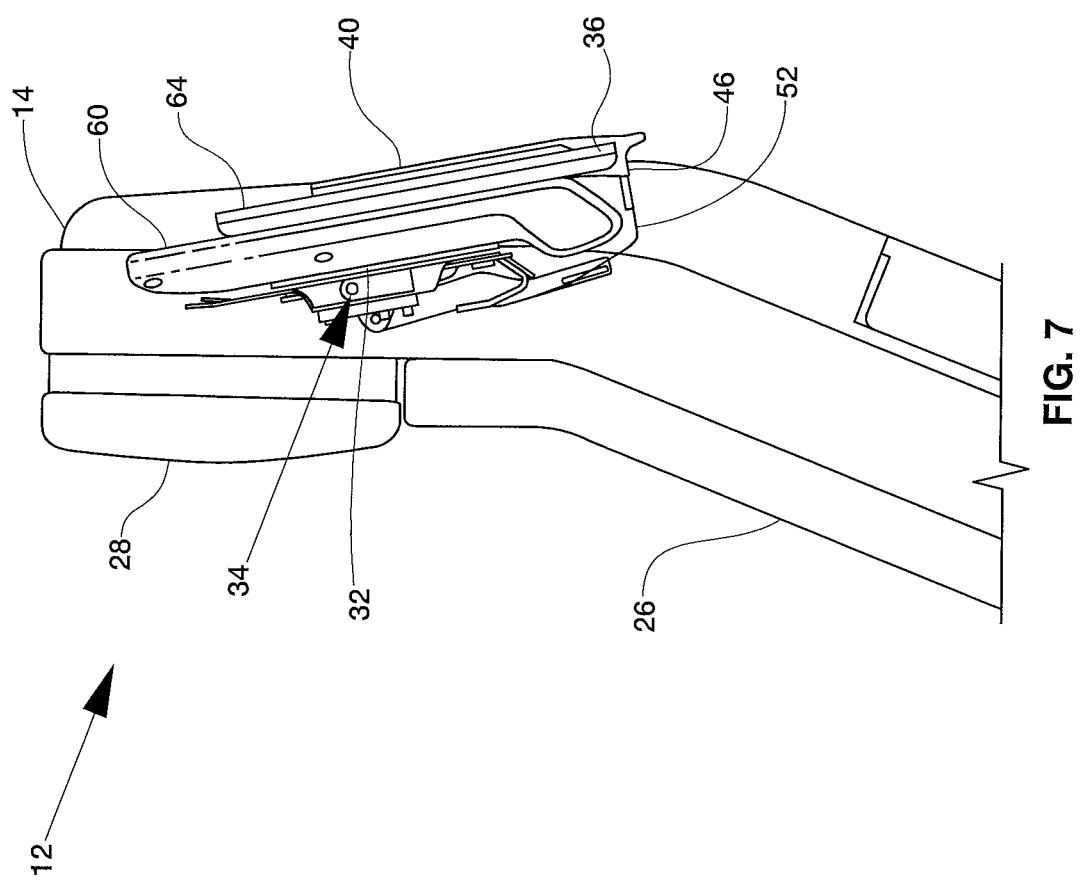
FIG. 7 is an enlarged cross-sectional right side view of the assembled seat system showing a tilt mechanism of one embodiment of the tilt assembly.
Figure 8:
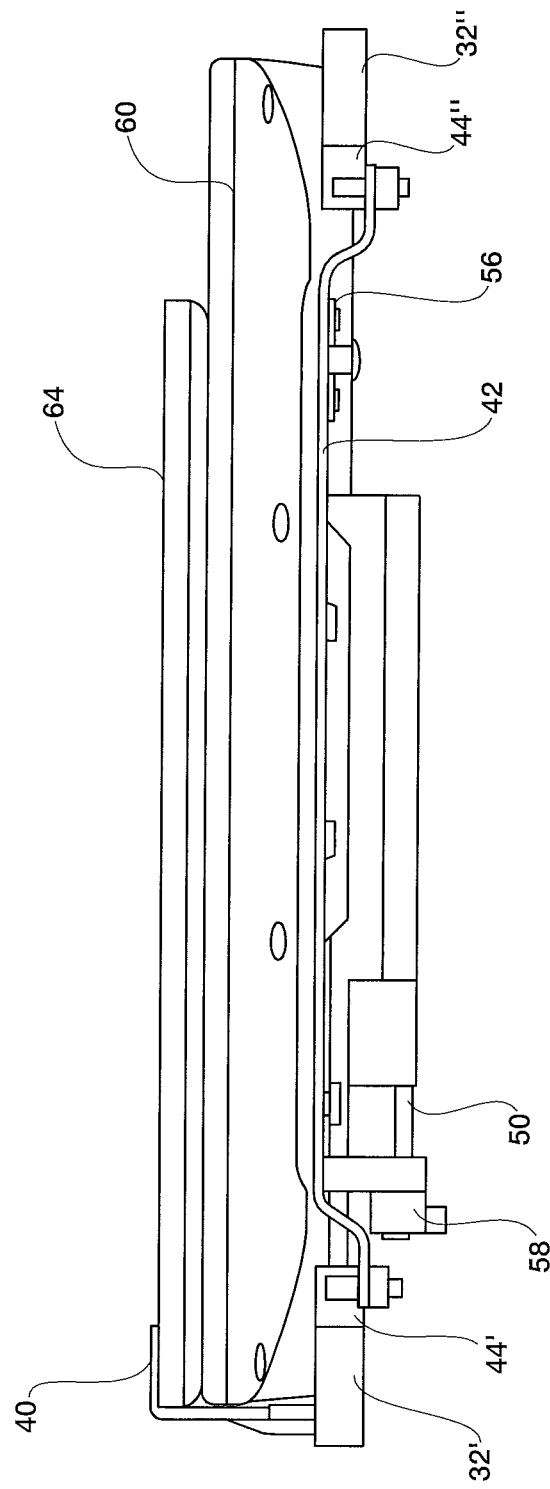
FIG. 8 is an enlarged cross-sectional top view of the mounting option.

As seen in FIG. 7, the second mount is attached to tilt assembly 34 so that second electronic device 64 may tilt with first electronic device 60 as the viewing angle is adjusted by the user operating the tilt assembly. FIG. 8 shows a top cross-sectional view of the mounting option with both first and second electronic devices mounted. In some embodiments, the second mount includes a bracket 50 attached to tilt assembly 34.

As shown in FIGS. 6A and 6B, bracket 50 may be a cantilevered bracket mounted to tilt assembly 34. The cantilevered bracket may be formed of a one-piece generally J-shaped resilient material. Bracket 50 may also be constructed of a non-mar material for protecting the outer surface of the second electronic device 64, and may be over molded with a non-mar material. In some embodiments, bracket 50 is attached to retainer assembly 40. To secure second electronic device 64, cantilevered bracket may be biased towards backrest 26. Yet in other embodiments, bracket 50 may be biased in another direction.

In the embodiment of FIGS. 3-8, bracket 50 is attached to shelf 36 biased upward and toward the headrest 28 to provide retractability. The second mount may further include a mounting arm 58 to limit the bracket's range of motion. As depicted in FIGS. 5A and 6A, mounting arm 58 includes a slot 59 designed to accept a prong 51 of bracket 50. At rest, prong 51 sits at the top end of slot 59. When shelf 36 is pulled down by a user, prong 51 slides down until it catches the bottom end of slot 59.

In yet other embodiments, second mount further includes one or more leaf springs 53 connected to first mount 42, and mounting arm 58 may be used to synchronize bracket 50 with leaf spring 53. By way of example, leaf spring 53 may be connected to retainer assembly 40.

Figure 9:
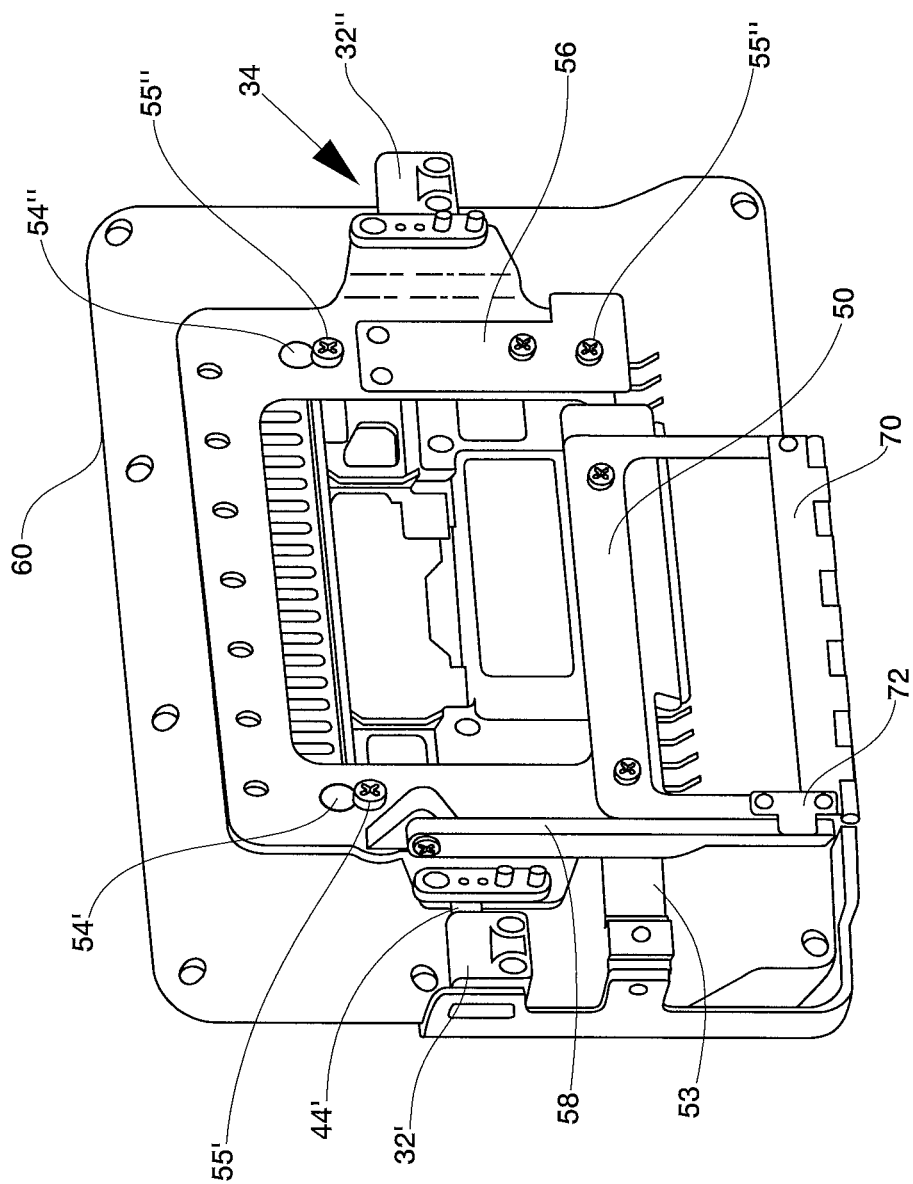
FIG. 9 is an enlarged rear perspective view of another embodiment of the mounting option.

Other mechanisms may be used to provide retractability to the second mount. Turning to FIG. 9, one embodiment may include a hinge 70 for retracting shelf 36. Hinge 70 is mounted onto bracket 50, and may be attached to mounting arm 58 via synchronous piece 72.

Figure 10:
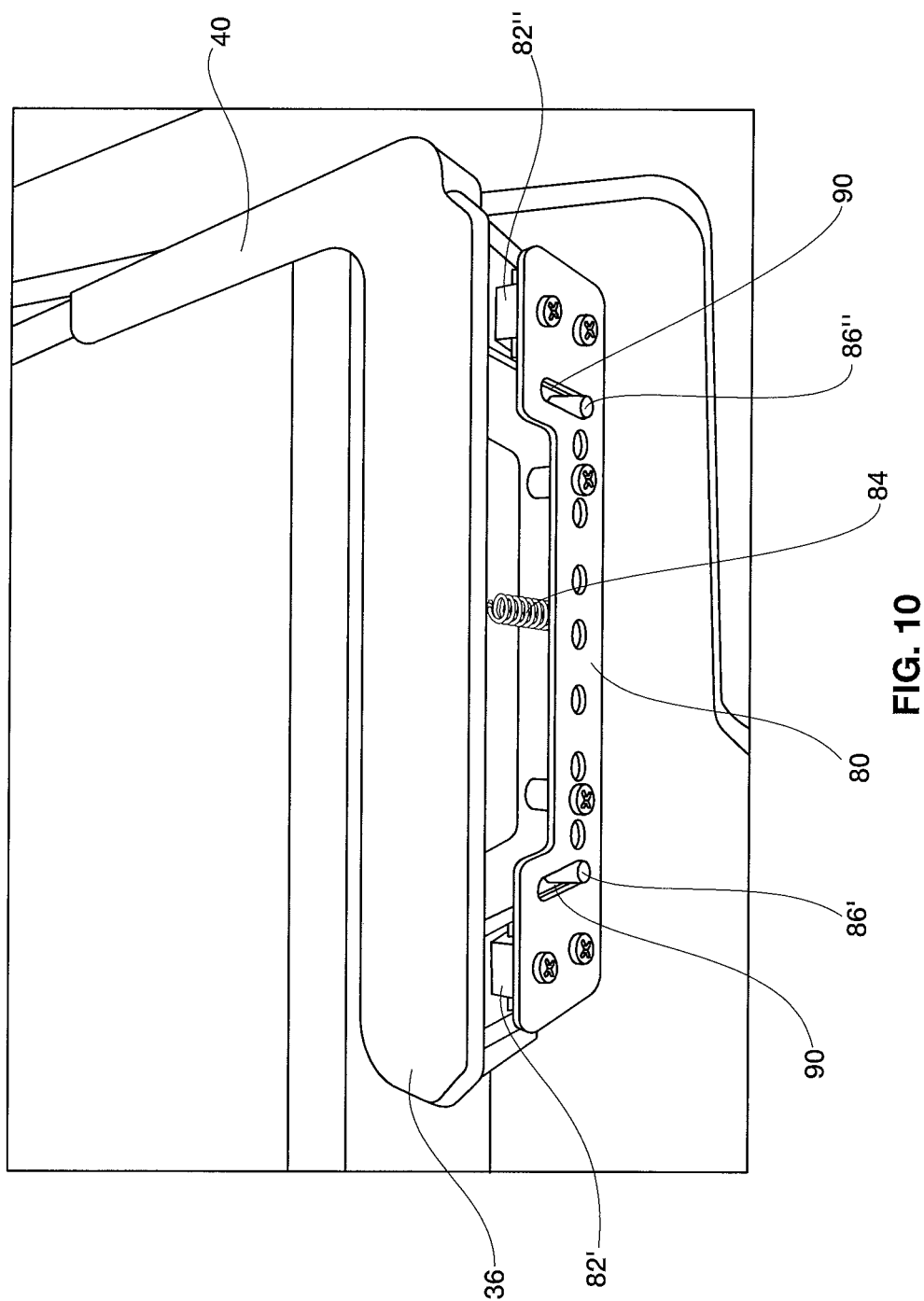
FIG. 10 is an enlarged bottom up perspective view of another alternative embodiment of the mounting option.

FIG. 10 shows another embodiment of how the second mount may be retractable. Bracket 50 may be mounted onto shelf 36 with plate 80. Shelf 36 may translocate along plate 80 using one or more guides 82. Shelf 36 may be biased toward headrest 28 using spring 84. The distance that shelf 36 retracts may be further limited by inserting prongs 86 into slots 90. In yet other embodiments, bracket 50 may be mounted onto retainer assembly 40 with plate 80 having guides 82.

Certain modifications and improvements will occur to those skilled in the art upon a reading of the foregoing description. For instance, more than one bracket may be used for the second mount. By way of example, the shelf and retainer assembly may be separate pieces with individual brackets attached to the tilt assembly. The shelf's bracket may be biased in an upward direction, while the retainer assembly may have a bracket biased toward the backrest. Other mechanisms of retractability for the shelf and bracket may be used and still be within the scope of the present inventions. Moreover, the first and second mounts are adapted to receive electronic devices, but it should be understood that the devices actually mounted onto the mounts may not be limited to only functional electronic devices. For example, a knockout blank for a monitor may be mounted on the first mount to give passengers when the carrier does not provide an inflight entertainment (IFE) monitor. The mounting options disclosed herein preferably include a tilt mechanism, but in other embodiments, the mounting option may be fixed. It should be understood that all such modifications and improvements have been deleted herein for the sake of conciseness and readability but are properly within the scope of the following claims.

We claim:

1. A seat system for a passenger aircraft, said seat system comprising:
   (a) at least one passenger seat; and
   (b) a mounting option for electronic devices attached to said passenger seat, said mounting option including a first mount including a tilt assembly, adapted to receive a first electronic device having a monitor or a knockout blank for a monitor and a second mount including a bracket attached to said tilt assembly and a plate mounted onto said second mount, adapted for receiving a second electronic device having a monitor, wherein said second mount positions the second electronic device overlaying the first electronic device having a monitor or a knockout blank for a monitor.

2. The seat system according to claim 1, further including a quick detach mechanism for removing the first electronic device having a monitor from said first mount.

3. The seat system according to claim 2, wherein said quick detach mechanism includes key slots and a retainer clip.

4. The seat system according to claim 3, wherein the first electronic device includes an OEM monitor.

5. The seat system according to claim 4, wherein said passenger seat further includes a monitor bezel surrounding said OEM monitor.

6. The seat system according to claim 5, wherein said monitor bezel is a two-piece construction.

7. The seat system according to claim 1, wherein said passenger seat includes a base frame, a seat component attached to said base frame and a backrest attached to said base frame adjoining the seat component.

8. The seat system according to claim 7, wherein said backrest further includes a headrest.

9. The seat system according to claim 8, wherein said headrest is adjustable to accommodate for the height of the passenger.

10. The seat system according to claim 7, wherein said passenger seat further includes an upholstery package.

11. The seat system according to claim 10, wherein said passenger seat further includes a trim package.

12. In a seat system for a passenger aircraft wherein the seat system includes at least one passenger seat having a backrest, the improvement comprising a mounting option for at least two electronic devices one overlaying the other electronic device, said mounting option comprising:
   (a) a bracket adapted to be attached to the backrest of said passenger seat;
   (b) a first mount including a tilt assembly attached to said bracket for receiving a first electronic device having a monitor or a knockout blank for a monitor; and
   (c) a second mount including a bracket attached to said tilt assembly and a plate mounted onto said second mount, said second mount including a shelf attached to said tilt assembly for receiving a second electronic device having a monitor, whereby said second mount positions the second electronic device overlaying the first electronic device having a monitor or a knockout blank for a monitor and said shelf tilts with said tilt assembly.

13. The mounting option according to claim 12, wherein said tilt assembly includes an OEM monitor mount and a pair of torque hinges attached between said OEM monitor mount and said bracket attached to the backrest.

14. The mounting option according to claim 13, wherein said pair of torque hinges are adjustable to accommodate for the weight of the OEM monitor mount.

15. The mounting option according to claim 13, wherein said pair of torque hinges are top mounted to provide upward tilting when the backrest of the passenger seat is reclined.

16. The mounting option according to claim 12, wherein said shelf attached to the tilt assembly for tilting with said tilt assembly includes a slot for receiving the second electronic device having a monitor.

17. The mounting option according to claim 12, wherein said shelf is constructed of a non-mar material for protecting the outer surface of the second electronic device having a monitor.

18. The mounting option according to claim 17, wherein said shelf is over molded with a non-mar material.

19. The mounting option according to claim 12, wherein said shelf is retractable.

20. The mounting option according to claim 12, wherein said bracket is a cantilevered bracket mounted to said tilt assembly.

21. The mounting option according to claim 20, wherein said cantilevered bracket is biased towards said backrest for holding the second electronic device having a monitor in a position overlaying the first electronic device having a monitor.

22. The mounting option according to claim 21, wherein said cantilevered bracket is formed of a one piece generally J-shaped resilient material.

23. The mounting option according to claim 22, wherein said cantilevered bracket is constructed of a non-mar material for protecting the outer surface of the second electronic device having a monitor.

24. The mounting option according to claim 23, wherein said cantilevered bracket is over molded with a non-mar material.

25. The mounting option according to claim 12, wherein said plate is mounted onto said second mount with one or more guides, said second mount adapted for translocation on said guides.

26. The mounting option according to claim 25, wherein said plate further includes one or more slots to limit translocation of said second mount on said guides.

27. The mounting option according to claim 12, further including a spring adapted to bias said second mount toward said backrest.

28. The mounting option according to claim 12, wherein said bracket further includes a hinge adapted to be connected to said second mount.

29. The mounting option according to claim 12, wherein said bracket is attached to said shelf.

30. The mounting option according to claim 12, further including a retainer assembly for holding the second electronic device having a monitor in a position overlaying the first electronic device having a monitor.

31. The mounting option according to claim 30, wherein said retainer assembly and said shelf are one piece.

32. The mounting option according to claim 30, wherein said bracket is attached to said retainer assembly.

33. A seat system for a passenger aircraft, said seat system comprising:
   (a) at least one passenger seat;
   (b) a mounting option for electronic devices attached to said passenger seat, said mounting option including (i) a bracket adapted to be attached to the backrest of said passenger seat; (ii) a first mount including a tilt assembly attached to said bracket for receiving a first electronic device having a monitor or a knockout blank for a monitor; and (iii) a second mount including a bracket attached to said tilt assembly and a plate mounted onto said second mount, said second mount including a shelf attached to said tilt assembly for receiving a second electronic device having a monitor, whereby said second mount positions the second electronic device overlaying the first electronic device having a monitor or a knockout blank for a monitor and said shelf tilts with said tilt assembly; and
   (c) a quick detach mechanism for removing the first electronic device having a monitor from said first mount.

34. The seat system according to claim 33, wherein said quick detach mechanism includes key slots and a retainer clip.

35. The seat system according to claim 34, wherein the first electronic device includes an OEM monitor.

36. The seat system according to claim 35, wherein said passenger seat further includes a monitor bezel surrounding said OEM monitor.

37. The seat system according to claim 36, wherein said monitor bezel is a two-piece construction.

38. The seat system according to claim 33, wherein said passenger seat includes a base frame, a seat component attached to said base frame and a backrest attached to said base frame adjoining the seat component.

39. The seat system according to claim 38, wherein said backrest further includes a headrest.

40. The seat system according to claim 39, wherein said headrest is adjustable to accommodate for the height of the passenger.

41. The seat system according to claim 38, wherein said passenger seat further includes an upholstery package.

42. The seat system according to claim 41, wherein said passenger seat further includes a trim package.

43. The mounting option according to claim 33, wherein said tilt assembly includes an OEM monitor mount and a pair of torque hinges attached between said OEM monitor mount and said bracket attached to the backrest.

44. The mounting option according to claim 43, wherein said pair of torque hinges are adjustable to accommodate for the weight of the OEM monitor mount.

45. The mounting option according to claim 43, wherein said pair of torque hinges are top mounted to provide upward tilting when the backrest of the passenger seat is reclined.

46. The mounting option according to claim 33, wherein said shelf attached to the tilt assembly for tilting with said tilt assembly includes a slot for receiving the second electronic device having a monitor.

47. The mounting option according to claim 33, wherein said shelf is constructed of a non-mar material for protecting the outer surface of the second electronic device having a monitor.

48. The mounting option according to claim 47, wherein said shelf is over molded with a non-mar material.

49. The mounting option according to claim 33, wherein said shelf is retractable.

50. The mounting option according to claim 33, wherein said bracket is a cantilevered bracket mounted to said tilt assembly.

51. The mounting option according to claim 50, wherein said cantilevered bracket is biased towards said backrest for holding the second electronic device having a monitor in a position overlaying the first electronic device having a monitor.

52. The mounting option according to claim 51, wherein said cantilevered bracket is formed of a one piece generally J-shaped resilient material.

53. The mounting option according to claim 52, wherein said cantilevered bracket is constructed of a non-mar material for protecting the outer surface of the second electronic device having a monitor.

54. The mounting option according to claim 53, wherein said cantilevered bracket is over molded with a non-mar material.

55. The mounting option according to claim 33, wherein said plate is mounted onto said second mount with one or more guides, said second mount adapted for translocation on said guides.

56. The mounting option according to claim 55, wherein said plate further includes one or more slots to limit translocation of said second mount on said guides.

57. The mounting option according to claim 33, further including a spring adapted to bias said second mount toward said backrest.

58. The mounting option according to claim 33, wherein said bracket further includes a hinge adapted to be connected to said second mount.

59. The mounting option according to claim 33, wherein said bracket is attached to said shelf.

60. The mounting option according to claim 33, further including a retainer assembly for holding the second electronic device having a monitor in a position overlaying the first electronic device having a monitor.

61. The mounting option according to claim 60, wherein said retainer assembly and said shelf are one piece.

62. The mounting option according to claim 60, wherein said bracket is attached to said retainer assembly.

\* \* \* \* \*